United States Patent
Eiden et al.

(10) Patent No.: US 11,281,290 B2
(45) Date of Patent: Mar. 22, 2022

(54) DISPLAY APPARATUS AND METHOD INCORPORATING GAZE-DEPENDENT DISPLAY CONTROL

(71) Applicant: Varjo Technologies Oy, Helsinki (FI)

(72) Inventors: Niko Eiden, Espoo (FI); Klaus Melakari, Oulu (FI); Jarno Wuolijoki, Helsinki (FI); Ville Kivistö, Helsinki (FI); Antti Peuhkurinen, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 16/903,970

(22) Filed: Jun. 17, 2020

(65) Prior Publication Data
US 2021/0397251 A1    Dec. 23, 2021

(51) Int. Cl.
*G06F 3/01* (2006.01)
*G06T 19/00* (2011.01)

(52) U.S. Cl.
CPC ............ *G06F 3/013* (2013.01); *G06T 19/006* (2013.01); *G06T 2210/36* (2013.01)

(58) Field of Classification Search
CPC .............................. G06F 3/013; G06T 19/006
USPC ............................................................ 345/7
See application file for complete search history.

(56) References Cited

U.S. PATENT DOCUMENTS

| | | | |
|---|---|---|---|
| 9,369,667 B2* | 6/2016 | Diao | H04N 7/15 |
| 9,905,143 B1* | 2/2018 | Konttori | G02B 7/1805 |
| 2019/0138094 A1* | 5/2019 | Miettinen | G06K 9/00604 |
| 2019/0324276 A1* | 10/2019 | Edwin | G09G 5/003 |
| 2020/0049946 A1* | 2/2020 | Peuhkurinen | G06F 3/013 |

* cited by examiner

*Primary Examiner* — Prabodh M Dharia
(74) *Attorney, Agent, or Firm* — Ziegler IP Law Group, LLC (57) ABSTRACT

A display system including eye-tracking means, first image renderer, second image renderer, optical combiner and processor is described. Eye-tracking data is processed to determine gaze directions of user's eyes. Gaze location and gaze velocity and/or acceleration of user is determined based on gaze directions of user's eyes. It is detected whether or not gaze has been fixated for predefined time period based on gaze location and gaze velocity and/or acceleration of user. If gaze has been fixated, input image is processed to generate and render first image and second image substantially simultaneously. Projection of rendered first image and projection of rendered second image are combined optically by optical combiner to create extended-reality scene. If gaze has not been fixated, input image is processed to generate and render first image via first image renderer, whilst switching off or dimming second image renderer.

20 Claims, 4 Drawing Sheets

ND METHOD
DISPLAY APPARATUS AND METHOD INCORPORATING GAZE-DEPENDENT DISPLAY CONTROL

TECHNICAL FIELD

The present disclosure relates to display systems. The present disclosure also relates to methods for displaying extended-reality scenes.

BACKGROUND

In recent times, extended-reality display apparatuses (for example, head-mounted devices) have seen major breakthroughs. There is an increasing demand for extended-reality display apparatuses that could mimic a foveated structure of human biological vision. In this regard, dual-display apparatuses are known. A dual-display apparatus comprises a narrow-angle display and a wide-angle display for incorporating foveation.

However, a major drawback of using a dual-display apparatus is that a sudden movement of a user's head causes visual artefacts (such as screen-tearing effects and the like) due to a mismatch in various dynamic properties (such as a refresh rate, a display persistence and the like) of separate displays of the dual-display apparatus. Therefore, a perceived image-rendering quality of such a dual-display apparatus is adversely affected due to sudden movement of the user's head.

Moreover, dual-display apparatuses have a high requirement for computational resources. Furthermore, the dual-display apparatuses have a high power consumption.

Therefore, in light of the foregoing discussion, there exists a need to overcome the aforementioned drawbacks associated with dual-display apparatuses.

SUMMARY

The present disclosure relates to display systems. The present disclosure also relates to methods for displaying extended-reality scenes. Furthermore, the present disclosure also seeks to provide a solution to the existing problems of dual-display systems.

In a first aspect, an embodiment of the present disclosure provides a display system comprising eye-tracking means, a first image renderer, a second image renderer, an optical combiner and at least one processor configured to:
a. process eye-tracking data obtained from the eye-tracking means to determine gaze directions of a user's eyes;
b. determine, based on the gaze directions of the user's eyes, a gaze location and a gaze velocity and/or acceleration of the user;
c. detect, based on the gaze location and the gaze velocity and/or acceleration of the user, whether or not the user's gaze has been fixated for at least a predefined time period;
d. when the user's gaze has been fixated for at least the predefined time period, process a given input image to generate and render a given first image and a given second image substantially simultaneously via the first image renderer and the second image renderer respectively, wherein a projection of the rendered first image and a projection of the rendered second image are to be combined optically by the optical combiner to create an extended-reality scene, and wherein the projection of the rendered second image is to substantially overlap with a portion of the projection of the rendered first image, further wherein a resolution of the projection of the rendered second image is higher than a resolution of the projection of the rendered first image; and
e. when the user's gaze has not been fixated for at least the predefined time period, process the given input image to generate and render a given first image via the first image renderer, whilst switching off or dimming the second image renderer, a projection of the given first image creating the extended-reality scene.

In a second aspect, an embodiment of the present disclosure provides a method of displaying, the method comprising:
a. processing eye-tracking data obtained from eye-tracking means to determine gaze directions of a user's eyes;
b. determining, based on the gaze directions of the user's eyes, a gaze location and a gaze velocity and/or acceleration of the user;
c. detecting, based on the gaze location and the gaze velocity and/or acceleration of the user, whether or not the user's gaze has been fixated for at least a predefined time period;
d. when the user's gaze has been fixated for at least the predefined time period, processing a given input image to generate and render a given first image and a given second image substantially simultaneously via a first image renderer and a second image renderer respectively, wherein a projection of the rendered first image and a projection of the rendered second image are combined optically by an optical combiner to create an extended-reality scene, and wherein the projection of the rendered second image substantially overlaps with a portion of the projection of the rendered first image, further wherein a resolution of the projection of the rendered second image is higher than a resolution of the projection of the rendered first image; and
e. when the user's gaze has not been fixated for at least the predefined time period, processing the given input image to generate and render a given first image via the first image renderer, whilst switching off or dimming the second image renderer, a projection of the given first image creating the extended-reality scene.

Embodiments of the present disclosure substantially eliminate or at least partially address the aforementioned problems in the prior art, by switching off or dimming the second image renderer when it is detected that the user's eye is not fixated for at least the predefined time period, thereby preventing visual artefacts arising due to a mismatch in various dynamic properties of the first image renderer and the second image renderer.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a display system comprising eye-tracking means, a first image renderer, a second image renderer, an optical combiner and at least one processor configured to:
a. process eye-tracking data obtained from the eye-tracking means to determine gaze directions of a user's eyes;
b. determine, based on the gaze directions of the user's eyes, a gaze location and a gaze velocity and/or acceleration of the user;
c. detect, based on the gaze location and the gaze velocity and/or acceleration of the user, whether or not the user's gaze has been fixated for at least a predefined time period;
d. when the user's gaze has been fixated for at least the predefined time period, process a given input image to generate and render a given first image and a given second image substantially simultaneously via the first image renderer and the second image renderer respectively, wherein a projection of the rendered first image and a projection of the rendered second image are to be combined optically by the optical combiner to create an extended-reality scene, and wherein the projection of the rendered second image is to substantially overlap with a portion of the projection of the rendered first image, further wherein a resolution of the projection of the rendered second image is higher than a resolution of the projection of the rendered first image; and
e. when the user's gaze has not been fixated for at least the predefined time period, process the given input image to generate and render a given first image via the first image renderer, whilst switching off or dimming the second image renderer, a projection of the given first image creating the extended-reality scene.

In another aspect, an embodiment of the present disclosure provides a method of displaying, the method comprising:
a. processing eye-tracking data obtained from eye-tracking means to determine gaze directions of a user's eyes;
b. determining, based on the gaze directions of the user's eyes, a gaze location and a gaze velocity and/or acceleration of the user;
c. detecting, based on the gaze location and the gaze velocity and/or acceleration of the user, whether or not the user's gaze has been fixated for at least a predefined time period;
d. when the user's gaze has been fixated for at least the predefined time period, processing a given input image to generate and render a given first image and a given second image substantially simultaneously via a first image renderer and a second image renderer respectively, wherein a projection of the rendered first image and a projection of the rendered second image are combined optically by an optical combiner to create an extended-reality scene, and wherein the projection of the rendered second image substantially overlaps with a portion of the projection of the rendered first image, further wherein a resolution of the projection of the rendered second image is higher than a resolution of the projection of the rendered first image; and
e. when the user's gaze has not been fixated for at least the predefined time period, processing the given input image to generate and render a given first image via the first image renderer, whilst switching off or dimming the second image renderer, a projection of the given first image creating the extended-reality scene.

Embodiments of the present disclosure provide the aforementioned display system and method. The display system employs the first image renderer (namely, a wide-angle image renderer) and the second image renderer (namely, a narrow-angle image renderer) along with the optical combiner to create an extended-reality scene incorporating foveated vision characteristics similar to the human vision. Beneficially, the second image renderer is switched off or dimmed when it is detected that the user's eye is not fixated for at least the predefined time period. By keeping the second image renderer switched off or dimmed when the user's eye is not fixated, visual artefacts (such as screen-tearing effects and the like) arising due to a mismatch in various dynamic properties (such as a refresh rate, a display persistence and the like) of the first image renderer and the second image renderer.

Moreover, this saves computing resources such as memory and processing power and reduces power consumption of the display apparatus.

In some implementations, the display system is implemented as a display apparatus that comprises the eye-tracking means, the first image renderer, the second image renderer, the optical combiner and the at least one processor.

In other implementations, the display system is implemented as a display apparatus and an external computing device communicably coupled to the display apparatus. In such implementations, the eye-tracking means, the first image renderer, the second image renderer and the optical combiner are components of the display apparatus, while the at least one processor comprises a processor of the display apparatus and a processor of the external computing device.

Throughout the present disclosure, the term "display apparatus" refers to specialized equipment that is configured to present an extended-reality scene (namely, a visual scene of an extended-reality environment) to a user when the display apparatus in operation is worn by the user on her/his head. It will be appreciated that the term "extended-reality" (namely, XR) encompasses Virtual Reality (VR), Augmented Reality (AR), Mixed Reality (MR) and the like. Therefore, the display apparatus acts as a device (for example, such as a VR headset, an AR headset, an MR headset, a pair of VR glasses, a pair of AR glasses, a pair of MR glasses and so forth) that, when operated, presents the extended-reality scene to the user.

The term "extended-reality scene" refers to an image that is produced via the first image renderer and, optionally, the second image renderer for presentation to the user. As an example, the extended-reality scene may correspond to a virtual-reality movie. As another example, the extended-reality scene may correspond to an educational augmented-reality video. As yet another example, the extended-reality scene may correspond to a mixed-reality game.

Throughout the present disclosure, the term "gaze direction" refers to a direction at which the user is gazing when the display apparatus, in operation, is worn by the user. A given gaze direction is measured with respect to a perspective of a given eye of the user. In this regard, it will be appreciated that left and right eyes of the user could have different gaze directions at a given point in time. In particular, this is more pronounced when the user is gazing at an object that is closer to her/him.

Moreover, throughout the present disclosure, a location whereat the user's gaze is directed is referred to as the "gaze location", while an angular velocity and/or acceleration with which the user's gaze location is changing is referred to as the "gaze velocity and/or acceleration". Typically, when the user's eyes are fixated, the gaze location indicates a location of an object of interest in the extended-reality scene. The term "object of interest" refers to an object present within the extended-reality scene towards which the gaze direction of the user is directed (namely, focused).

In some implementations, the gaze location is determined as a two-dimensional location in a two-dimensional coordinate space, based on the gaze directions of the left and right eyes (namely, by convergence of the gaze directions).

In other implementations, the gaze location is determined as a three-dimensional location in a three-dimensional coordinate space, based on the gaze directions of the left and right eyes and a head pose of the user. Optionally, in this regard, the display system further comprises head-tracking means, wherein the at least one processor is configured to process head-tracking data obtained from the head-tracking means to determine the head pose of the user. Optionally, when determining the gaze location and the gaze velocity and/or acceleration, the at least one processor is configured to:

a. determine the gaze location as a three-dimensional location at which the user's gaze is directed, based on the head pose of the user and the convergence of the gaze directions of the user's eyes, wherein the three-dimensional location is determined in a global coordinate space of the extended-reality scene; and b. determine the gaze velocity and/or acceleration as an angular velocity and/or acceleration with which the user's gaze location is changing.

It will be appreciated that determining the gaze location as the three-dimensional location is beneficial, as the user's head pose keeps changing along with the gaze direction.

Throughout the present disclosure, the term "head-tracking means" refers to a specialized equipment for detecting and optionally, following changes in the head pose of the user, when the display apparatus is worn by the user. The head-tracking means could be implemented as at least one of: an optics-based positioning system (which utilizes, for example, infrared beacons and detectors, visible-light cameras and the like), an acoustics-based positioning system, a radio-based positioning system, a magnetism-based positioning system, an Inertial Measurement Unit (IMU). Such head-tracking means are well-known in the art.

Throughout the present disclosure, the term "head pose" refers to a position and an orientation of the user's head in a three-dimensional coordinate space. The three-dimensional coordinate space could be the global coordinate space of the extended-reality scene.

Throughout the present disclosure, the term "eye-tracking means" refers to a specialized equipment for detecting and/or following a direction of gaze of the user, when the display apparatus in operation is worn by the user. The eye-tracking means could be implemented as contact lenses with sensors, cameras monitoring a position of a pupil of the user's eye, and the like. Such eye-tracking means well-known in the art.

Furthermore, optionally, the at least one processor is configured to store information about the extended-reality environment as an environment map and utilize the environment map to obtain the given input image based on the head pose of the user. As a result, the extended-reality scene presents a portion of the extended-reality environment that corresponds to the head pose of the user.

Pursuant to embodiments of the present disclosure, the term "gaze fixation" refers to maintaining (namely, fixation of) the user's gaze on an object of interest present in the extended-reality scene. Typically, a human eye is capable of resolving approximately 20 individual images per second. Thus, gaze fixation can be considered to have occurred, if the user's gaze has been fixated on the object of interest for at least $\frac{1}{20}^{th}$ of a second (namely, 50 milliseconds). Optionally, the predefined time period is 50 milliseconds. Alternatively, optionally, the predefined time period is selected from within a range of 40 to 200 milliseconds.

It will be appreciated that a change in the gaze location (namely, a shift in the user's gaze) generally indicates a realignment of a line of sight in order to bring an image of a moving object of interest or a new object of interest at and around a fovea of the user's eye. The fovea is a portion of the eye that is typically located at a center of a retina of the eye, where a receptor density and hence a visual resolution are the highest. Thus, it is generally known that the fovea is the portion having clearest vision.

It will also be appreciated that when the user's gaze is fixated on an object of interest in the extended-reality scene, it is beneficial to produce a high-resolution image of the object of interest (namely, the second image) at and around the fovea of the user's eye. However, if the user's gaze is not fixated, it is not essential to produce a high-resolution image. In such a case, a low-resolution image (namely, the first image) of the extended-reality scene is sufficient to be presented to the user.

In a case when the user's gaze has been fixated for at least the predefined time period, the given first image and the given second image are rendered substantially simultaneously. By rendering the given first image and the given second image "substantially simultaneously", it is meant that a time instant of rendering the given first image and a time instant of rendering the given second image lie within 200 milliseconds of each other, and more optionally, within 20 milliseconds of each other.

Moreover, in such a case, the projection of the rendered first image is optically combined (by an optical combiner) with the projection of the rendered second image to create the aforesaid extended reality-scene. In other words, the projection of the rendered first image and the projection of the rendered second image are superimposed to present the extended-reality scene to the user.

Furthermore, the resolution of the projection of the rendered second image is higher than the resolution of the projection of the rendered first image. This can be achieved by various ways. In some implementations, a resolution of the second image is higher than a resolution of the first image. In other implementations, the resolution of the second image is same as the resolution of the first image. However, in such implementations, the display apparatus further comprises at least one optical element that is arranged to de-magnify the projection of the second image, thereby increasing its apparent resolution.

Optionally, the resolution of the projection of the rendered second image with respect to the user's eye lies in a range of 20 to 100 pixels per degree. For example, the resolution of the projection of the rendered second image may be from 20, 30, 40, 50, 60, 70, 80, 90 pixels up to 30, 40, 50, 60, 70, 80, 90, 100 pixels per degree.

Optionally, the resolution of the projection of the rendered first image with respect to the user's eye lies in a range of 5 to 30 pixels per degree. For example, the resolution of the projection of the rendered first image may be from 5, 10, 15, 20, 25 pixels per degree up to 10, 15, 20, 25 and 30 pixels per degree.

In another case when the user's gaze has not been fixated for at least the predefined time period, only the given first image is rendered. Moreover, the second image renderer (which is employed to render the given second image) is either switched-off or dimmed. Thus, the extended-reality scene is created, in such a case, from the projection of the given first image only.

It will be appreciated that detection of whether or not the user's gaze has been fixated for at least the predefined time period is performed repeatedly. Optionally, a time interval for performing the aforesaid detection is selected based on a frame rate of the display apparatus. For illustration purposes only, there will now be considered an example case in which the display apparatus is employed to render 100 frames per second (FPS). This essentially means that a new extended-reality scene is to be created every 10 milliseconds. In such a case, the at least one processor is configured to perform, every 10 milliseconds, detection of whether or not the user's gaze has been fixated for at least the predefined time period.

Moreover, it will be appreciated that the gaze location may or may not change when the user's gaze is fixated. While the user's gaze is fixated on an object of interest, the gaze location could change if:
a. the object of interest is moving, while the user's head pose is fixed,
b. the object of interest is stationary, but the user's head pose is changing, or
c. the object of interest is moving, while the user's head pose is changing.

In such cases, the user's gaze closely follows the object of interest and shifts in a steady and smooth manner, so as to form an image of the object of interest on the fovea of the user's eye. Such an eye movement is known as "smooth-pursuit eye movement", and is well-known in the art. Thus, smooth-pursuit eye movements allow clear vision of a moving object by holding the image steady on the fovea. In all the above-mentioned cases, the eye is fixated (namely, the user is looking) at the object of interest.

Furthermore, the projection of the rendered second image is to substantially overlap with the aforesaid portion of the projection of the rendered first image. In other words, a field of view of the given second image is narrower than a field of view of the given first image. Optionally, an angular width of the field of view of the given second image with respect to the user's eye lies in a range of 5 to 60 degrees, while an angular width of the field of view of the given first image with respect to the user's eye lies in a range of 40 to 220 degrees. For example, the angular width of the field of view of the given second image may be from 5, 10, 15, 20, 25, 30, 35, 40, 45, 50 or 55 degrees up to 10, 15, 20, 25, 30, 35, 40, 45, 50, 55 or 60 degrees. Likewise, the angular width of the field of view of the given first image may be from 40, 50, 60, 70, 80, 90, 100, 110, 120, 130, 140, 150, 160, 170, 180, 190, 200 or 210 degrees up to 50, 60, 70, 80, 90, 100, 110, 120, 130, 140, 150, 160, 170, 180, 190, 200, 210 or 220 degrees.

Throughout the present disclosure, the term "angular width" refers to an angular width of a field of view (or a region of the field of view) from a perspective of the user's eye, namely with respect to a center of the user's gaze.

Hereinabove, by "substantially overlap", it is meant that a misalignment between pixels in the projection of the rendered second image and corresponding pixels in the aforesaid portion of the projection of the rendered first image lies within a range of 0 to 10 pixels, and more optionally, within a range of 0 to 5 pixels.

It will be appreciated that the extended-reality scene that is visible to the user has variable resolution and therefore, emulates foveation characteristics of the human visual system. To the user, the extended-reality scene has a higher resolution in a region of the extended-reality scene that corresponds to the rendered second image, as compared to a remaining region of the extended-reality scene. As a result, the user's experience of viewing the extended-reality scene is considerably enhanced.

Optionally, the given second image is rectangular in shape. Alternatively, optionally, the given second image is circular in shape. Yet alternatively, optionally, the given second image is two-dimensional capsule-shaped. It will be appreciated that the given second image may have any other polygonal shape.

Optionally, the given second image is generated by cropping the given image, while the given first image is generated by down-sampling the given input image. Optionally, in this regard, when generating the given first image, the at least one processor is configured to generate a given pixel in the given first image by combining a plurality of corresponding pixels in the given input image.

In some implementations, when generating the given first image and the given second image, the at least one processor is configured to:
a. generate the given second image from a central region of the given input image; and
b. generate the given first image from at least a region of the given input image that includes and surrounds the central region of the given input image.

In such implementations, the display system incorporates fixed foveation. The generation of the second image from the central region of the given input image enables a fixed region of the input image to be presented at a high resolution.

In an embodiment, when generating the given first image, the at least one processor is configured to mask a region of the given first image that corresponds to the central region of the given input image, wherein a projection of the masked region of the rendered first image is to substantially overlap with the projection of the rendered second image. This potentially reduces (for example, minimizes) the distortion at the transition between the rendered first image and the rendered second image. It will be appreciated that the projection of the masked region of the rendered first image is the same as the aforesaid portion of the projection of the rendered first image that overlaps with the projection of the rendered second image).

By "masking", it is meant that pixels of the masked region of the given first image are dimmed or darkened. Optionally, said masking is performed using:

a. a linear transparency-mask blend of inverse values between the rendered first image and the rendered second image at their transition, b. stealth (or camouflage) patterns containing shapes naturally difficult for detection by a human eye, and so forth.

In another embodiment, when generating the given first image, the at least one processor is configured to reduce an intensity of a region of the given first image that corresponds to the central region of the given input image, wherein the intensity of said region of the given first image is reduced with respect to an intensity of the central region of the given input image, wherein, when generating the given second image, the at least one processor is configured to adjust an intensity of the given second image according to the intensity of said region of the given first image.

It will be appreciated that the intensity of the second image is to be adjusted in a manner that, when superimposed, the projection of the rendered second image and a projection of said region of the given first image appear to have the intensity of the central region of the given input image. Techniques for adjusting intensities of the first image and the second image are described in U.S. patent application Ser. No. 16/223,657 and U.S. patent application Ser. No. 16/505,982, which are incorporated herein by reference.

Moreover, in an embodiment, the at least one processor is configured to:

a. identify, based on the gaze location of the user, an object of interest in the extended-reality scene;

b. determine whether the object of interest is located in a central region or a peripheral region of a field of view of the extended-reality scene;

c. when the user's gaze has been fixated for at least the predefined time period and the object of interest is located in the central region of the field of view, process the given input image to generate and render the given first image and the given second image substantially simultaneously via the first image renderer and the second image renderer respectively; and d. when the user's gaze has been fixated for at least the predefined time period and the object of interest is located in the peripheral region of the field of view, process the given input image to generate and render the given first image via the first image renderer, whilst switching off or dimming the second image renderer.

It will be appreciated that the abovementioned embodiment is a specific implementation of the display system that incorporates fixed foveation. In this specific implementation, the first image renderer and the second image renderer are employed to render the first image and the second image, respectively, only when the user's gaze has been fixated for at least the predefined time period and the object of interest is located in the central region of the field of view. When the object of interest is located in the peripheral region of the field of view, only the first image renderer is to be employed for rendering the first image, whilst switching off or dimming the second image renderer. This saves the computing resources and reduces the power consumption of the display apparatus greatly.

The central region of the field of view has an angular width that lies in a range of 5 to 60 degrees, whereas the peripheral region of the field of view has an angular width that lies in a range of 40 to 220 degrees. For example, the angular width of the central region may be from 5, 10, 15, 20, 25, 30, 35, 40, 45, 50 or 55 degrees up to 10, 15, 20, 25, 30, 35, 40, 45, 50, 55 or 60 degrees. Likewise, the angular width of the peripheral region may be from 40, 50, 60, 70, 80, 90, 100, 110, 120, 130, 140, 150, 160, 170, 180, 190, 200 or 210 degrees up to 50, 60, 70, 80, 90, 100, 110, 120, 130, 140, 150, 160, 170, 180, 190, 200, 210 or 220 degrees.

When identifying the object of interest in the extended-reality scene, the at least one processor is configured to:

a. identify a plurality of pixel segments representative of a plurality of objects present within the extended-reality scene; and b. identify, based on the gaze location of the user, at least one of the pluralities of pixel segments at which the user is gazing, wherein the at least one of the plurality of pixel segments represents the object of interest.

It will be appreciated that the location of the object of interest is to be determined in the extended-reality scene, because the object of interest could be a real object (present within the given input image) or a virtual object (overlaid on the given input image to generate the extended-reality scene).

In other implementations, when generating the given first image and the given second image, the at least one processor is configured to:

a. determine a region of interest of the given input image based on at least one of: the gaze directions of the user's eyes, scene information of the extended-reality scene;

b. generate the given second image from the region of interest of the given input image; and c. generate the given first image from at least a region of the given input image that includes and surrounds the region of interest of the given input image.

In such implementations, active foveation is achieved by presenting the region of interest at a resolution that is much greater than a resolution of a remaining region of the given input image. Throughout the present disclosure, the term "region of interest" refers to a region of the given input image whereat the user's gaze is directed (namely, focused) when the user views the extended-reality scene. When the user's gaze is directed towards the region of interest, the region of interest is focused onto the fovea of the user's eyes, and is resolved to a much greater detail as compared to the remaining region of the given input image.

In an embodiment, when generating the given first image, the at least one processor is configured to mask a region of the given first image that corresponds to the region of interest of the given input image, wherein a projection of the masked region of the rendered first image is to substantially overlap with the projection of the rendered second image.

In another embodiment, when generating the given first image, the at least one processor is configured to reduce an intensity of a region of the given first image that corresponds to the region of interest of the given input image, wherein the intensity of said region of the given first image is reduced with respect to an intensity of the region of interest of the given input image, wherein, when generating the given second image, the at least one processor is configured to adjust an intensity of the given second image according to the intensity of said region of the given first image.

Throughout the present disclosure, the term "processor" refers to hardware, software, firmware or a combination of these, suitable for controlling an operation of the display system. The at least one processor is communicably coupled with the eye tracking means, the first image renderer and the second image renderer.

Throughout the present disclosure, the term "image renderer" refers to an equipment that, in operation, renders a given image. The first image renderer and/or the second image renderer could be implemented as a display and/or a projector. When implemented as the projector, the extended-reality scene could be created onto a projection screen or directly onto the retina of the user's eye.

It will be appreciated that the first image renderer could be shared in common between the left and right eyes of the user. In such a case, a configuration of half mirrors and full mirrors could be arranged to direct light towards the left and right eyes. Alternatively, there could be separate first image renderers for the left eye and the right eye of the user. Similarly, the second image renderer could also be shared in common between the left and right eyes of the user. Alternatively, there could also be separate second image renderers for the left eye and the right eye of the user.

Moreover, the term "optical combiner" refers to an equipment (for example, such as one or more optical elements) for optically combining a projection of a first image with a projection of a second image to create an extended-reality scene. Optionally, the optical combiner is implemented by way of at least one of: a lens, a mirror, a semi-transparent mirror, a semi-transparent film, a semi-transparent flexible membrane, a prism, a beam splitter, an optical waveguide, a polarizer.

The term "projection of a given image" refers to a collection of light rays emanating from a given image renderer. The projection of the given image (namely, the collection of light rays) may transmit through and/or reflect from various components of the display apparatus, including the optical combiner, before reaching the user's eye. For purposes of embodiments of the present disclosure, the term "projection of a given image" has been used consistently, irrespective of whether the collection of light rays is transmitted or reflected.

Furthermore, the present disclosure also relates to the aforementioned method. Various embodiments and variants disclosed above, with respect to the aforementioned first aspect, apply mutatis mutandis to the method.

In some implementations, the step of generating the given first image and the given second image comprises:
a. determining a region of interest of the given input image based on at least one of: the gaze directions of the user's eyes, scene information of the extended-reality scene;
b. generating the given second image from the region of interest of the given input image; and
c. generating the given first image from at least a region of the given input image that includes and surrounds the region of interest of the given input image.

In an embodiment, the step of generating the given first image comprises masking a region of the given first image that corresponds to the region of interest of the given input image, wherein a projection of the masked region of the rendered first image substantially overlaps with the projection of the rendered second image.

In another embodiment, the step of generating the given first image comprises reducing an intensity of a region of the given first image that corresponds to the region of interest of the given input image, wherein the intensity of said region of the given first image is reduced with respect to an intensity of the region of interest of the given input image,
wherein the step of generating the given second image comprises adjusting an intensity of the given second image according to the intensity of said region of the given first image.

In other implementations, the step of generating the given first image and the given second image comprises:
a. generating the given second image from a central region of the given input image; and
b. generating the given first image from at least a region of the given input image that includes and surrounds the central region of the given input image.

In an embodiment, the step of generating the given first image comprises masking a region of the given first image that corresponds to the central region of the given input image, wherein a projection of the masked region of the rendered first image substantially overlaps with the projection of the rendered second image.

In another embodiment, the step of generating the given first image comprises reducing an intensity of a region of the given first image that corresponds to the central region of the given input image, wherein the intensity of said region of the given first image is reduced with respect to an intensity of the central region of the given input image,
wherein the step of generating the given second image comprises adjusting an intensity of the given second image according to the intensity of said region of the given first image.

In the other implementations, the method further comprises:
a. identifying, based on the gaze location of the user, an object of interest in the extended-reality scene;
b. determining whether the object of interest is located in a central region or a peripheral region of a field of view of the extended-reality scene;
c. when the user's gaze has been fixated for at least the predefined time period and the object of interest is located in the central region of the field of view, processing the given input image to generate and render the given first image and the given second image substantially simultaneously via the first image renderer and the second image renderer respectively; and
d. when the user's gaze has been fixated for at least the predefined time period and the object of interest is located in the peripheral region of the field of view, processing the given input image to generate and render the given first image via the first image renderer, whilst switching off or dimming the second image renderer.

According to an embodiment, the step of generating the given first image comprises generating a given pixel in the given first image by combining a plurality of corresponding pixels in the given input image.

According to an embodiment, the method further comprises processing head-tracking data obtained from head-tracking means to determine a head pose of the user, wherein the step of determining the gaze location and the gaze velocity and/or acceleration comprises:
a. determining the gaze location as a three-dimensional location at which the user's gaze is directed, based on the head pose of the user and a convergence of the gaze directions of the user's eyes, wherein the three-dimensional location is determined in a global coordinate space of the extended-reality scene; and b. determining the gaze velocity and/or acceleration as an angular velocity and/or acceleration with which the user's gaze location is changing.

DETAILED DESCRIPTION OF THE DRAWINGS

Figure 1:
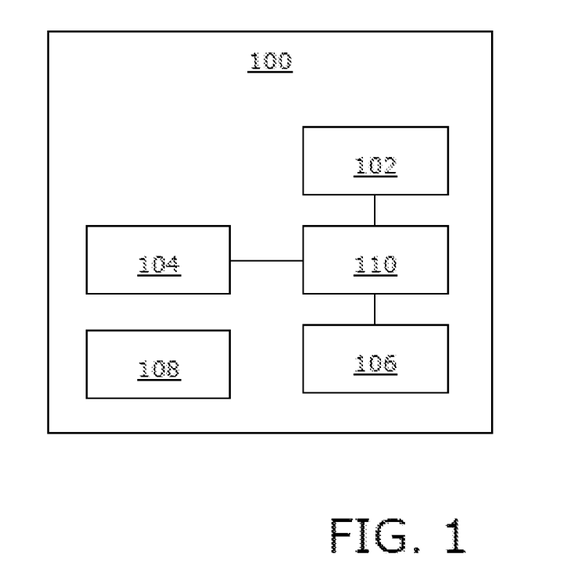
FIG. 1 is a block diagram of architecture of a display system, in accordance with an embodiment of the present disclosure.

Referring to FIG. 1, illustrated is a block diagram of architecture of a display system 100, in accordance with an embodiment of the present disclosure. The display system 100 comprises eye-tracking means 102, a first image renderer 104, a second image renderer 106, an optical combiner 108 and at least one processor depicted as a processor 110. The processor 110 is communicably coupled to the eye-tracking means 102, the first image renderer 104 and the second image renderer 106.

Figure 2:
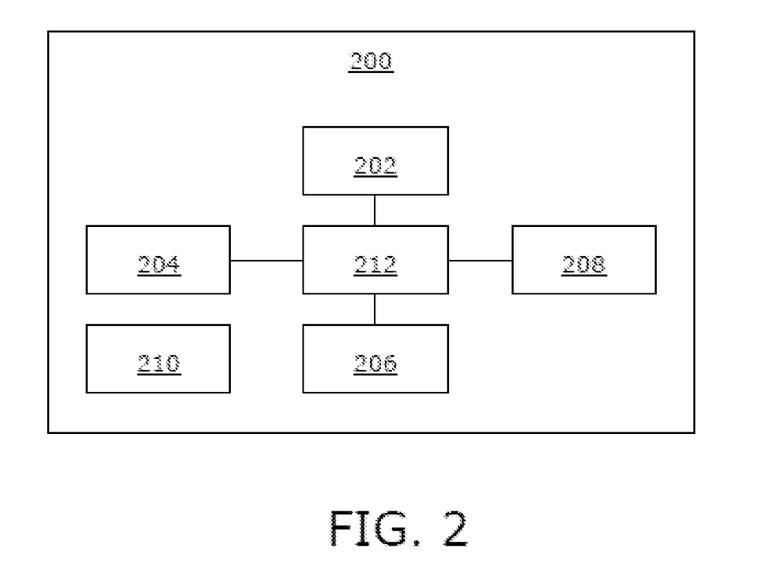
FIG. 2 is a block diagram of architecture of a display system, in accordance with another embodiment of the present disclosure.

Referring to FIG. 2, illustrated is a block diagram of architecture of a display system 200, in accordance with another embodiment of the present disclosure. The display system 200 comprises eye-tracking means 202, head-tracking means 204, a first image renderer 206, a second image renderer 208, an optical combiner 210 and at least one processor depicted as a processor 212. The processor 212 is communicably coupled to the eye-tracking means 202, the head-tracking means 204, the first image renderer 206 and the second image renderer 208.

It will be appreciated that FIG. 1 and FIG. 2 depict simplified architectures of the display system 100 and the display system 200, respectively, for the sake of clarity, which should not unduly limit the scope of the claims herein. A person skilled in the art will recognize many variations, alternatives and modifications of embodiments of the present disclosure.

Figure 3:
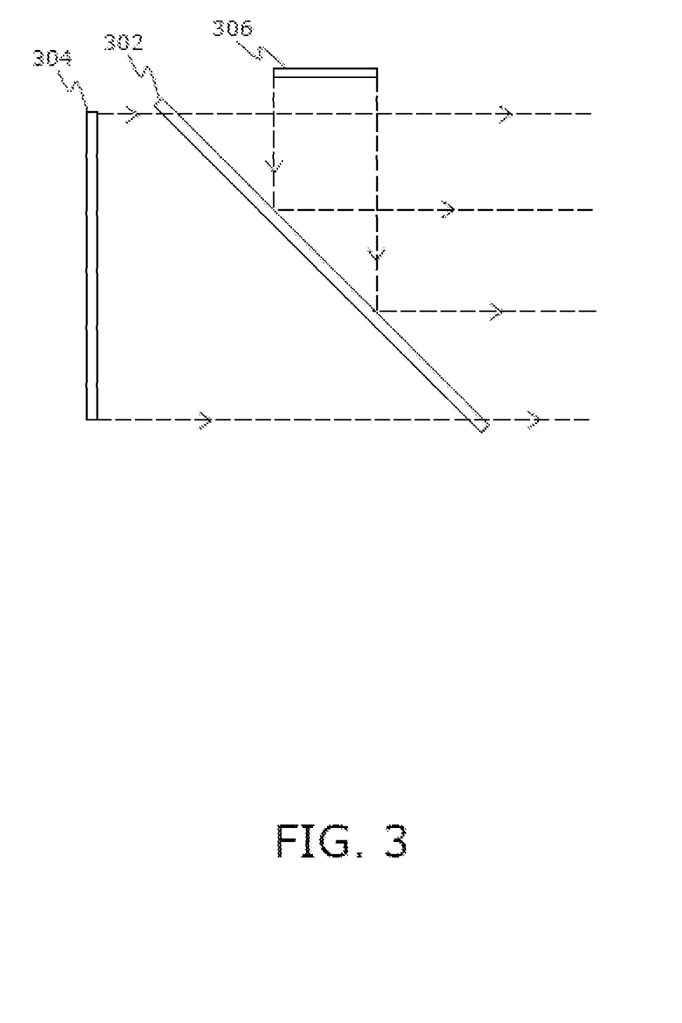
FIG. 3 is a ray diagram of how projections are optically combined by an optical combiner, in accordance with an embodiment of the present disclosure.

Next, FIG. 3 is a simplified ray diagram of how projections are optically combined by an optical combiner 302. A projection of a given first image rendered at a first image renderer 304 is optically combined with a projection of a given second image rendered at a second image renderer 306 to create an extended reality-scene. In other words, the projection of the rendered first image and the projection of the rendered second image are superimposed to create the extended-reality scene.

As shown, the projection of the rendered second image substantially overlaps with only a portion of the projection of the rendered first image. In other words, a field of view of the rendered second image is narrower than a field of view of the rendered first image.

It will be appreciated that FIG. 3 depicts a simplified two-dimensional side view and is merely an example, which should not unduly limit the scope of the claims herein. A person skilled in the art will recognize many variations, alternatives and modifications of embodiments of the present disclosure.

Figure 4:
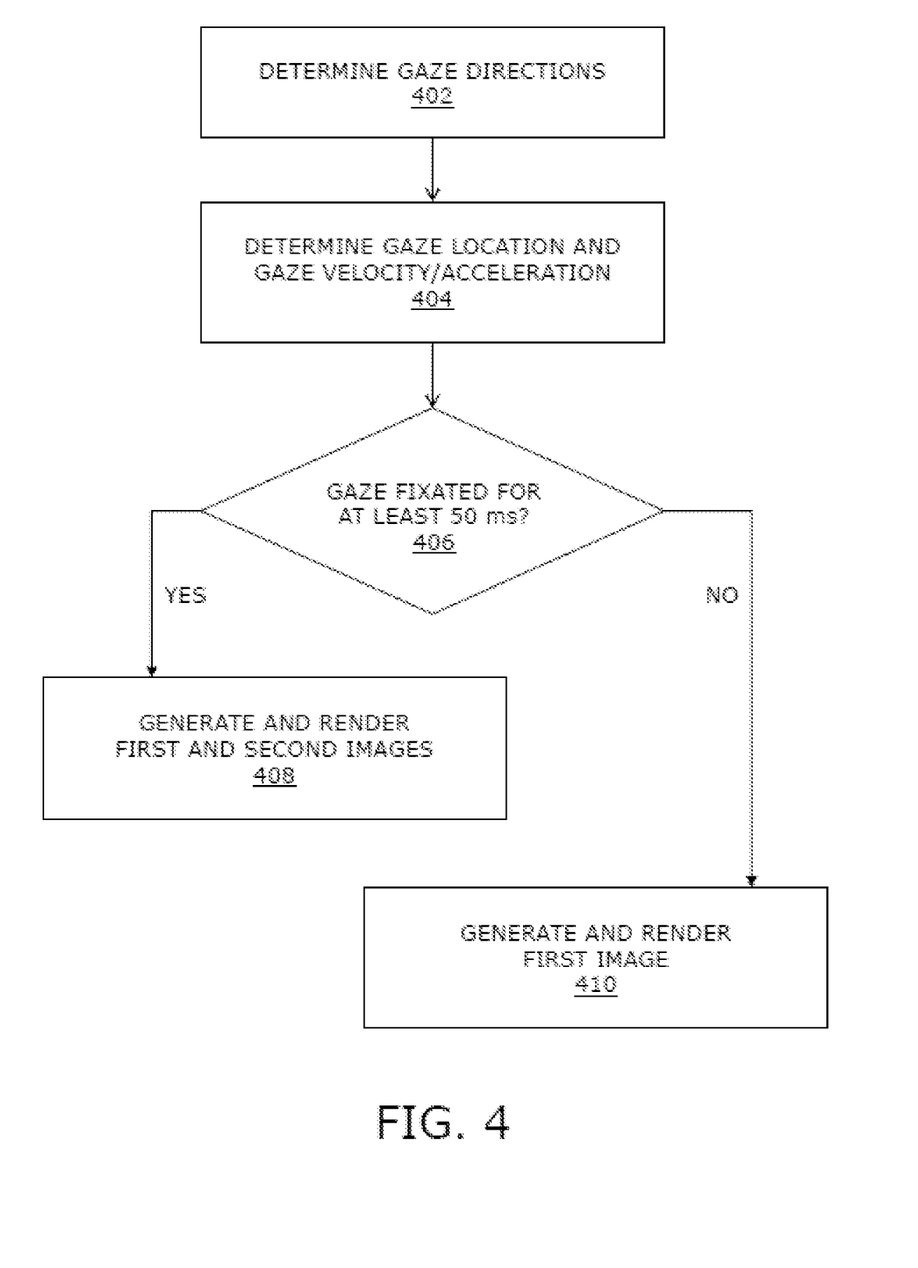
FIG. 4 is a flow chart depicting a method of displaying, in accordance with an embodiment of the present disclosure.

Referring to FIG. 4, illustrated are steps of a method of displaying, in accordance with an embodiment of the present disclosure. At a step 402, eye-tracking data obtained from eye-tracking means is processed to determine gaze directions of a user's eyes. At a step 404, a gaze location and a gaze velocity and/or acceleration of the user is determined based on the gaze directions of the user's eyes. At a step 406, it is detected, based on the gaze location and the gaze velocity and/or acceleration of the user, whether or not the user's gaze has been fixated for at least the predefined time period.

If, at the step 406, it is detected that the user's gaze has been fixated for at least the predefined time period, a step 408 is performed. In accordance with the step 408, a given input image is processed to generate and render a given first image and a given second image substantially simultaneously via a first image renderer and a second image renderer, respectively. In such a case, a projection of the rendered first image and a projection of the rendered second image are combined optically by an optical combiner to create an extended-reality scene, wherein the projection of the rendered second image substantially overlaps with a portion of the projection of the rendered first image. Moreover, a resolution of the projection of the rendered second image is higher than a resolution of the projection of the rendered first image.

If, at the step 406, it is detected that the user's gaze has not been fixated for at least the predefined time period, a step 410 is performed. In accordance with the step 410, the given input image is processed to generate and render a given first image via the first image renderer, whilst switching off or dimming the second image renderer. In such a case, a projection of the rendered first image creates the extended-reality scene.

Figure 5:
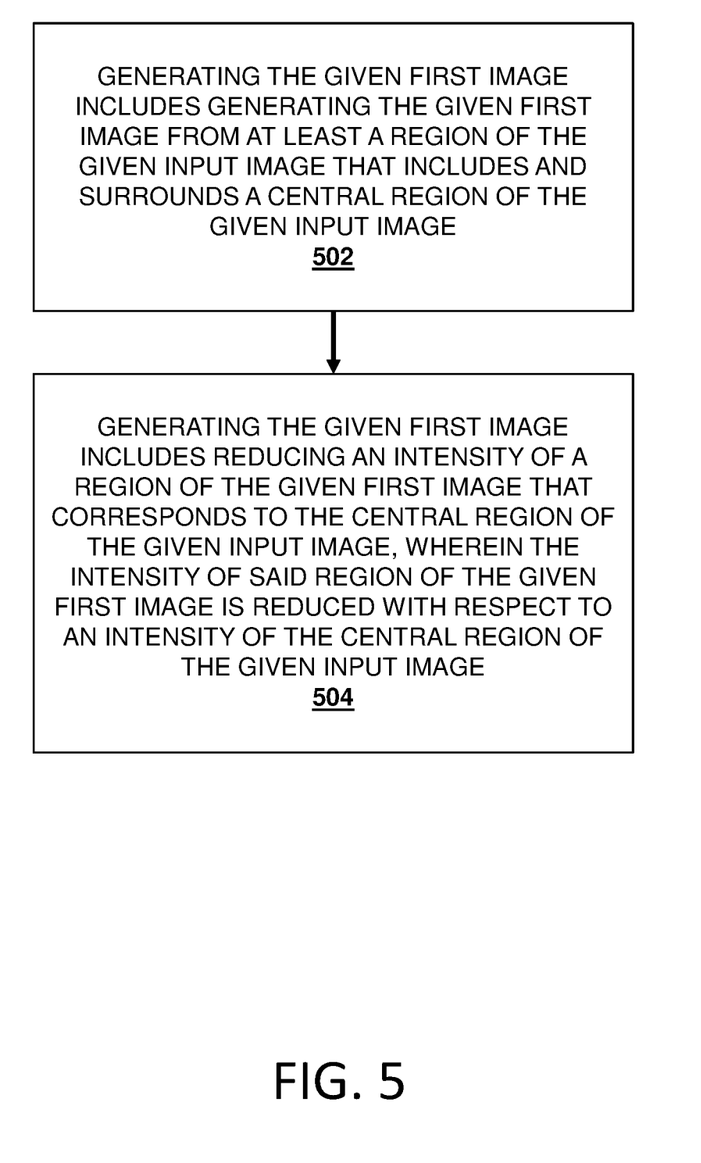
FIG. 5 is a flow chart depicting additional features of the method of displaying shown in FIG. 4, in accordance with an embodiment of the present disclosure.

FIG. 5 illustrates additional features of the method of displaying shown in FIG. 4. At step 502, generating the given first image includes generating the given first image from at least a region of the given input image that includes and surrounds a central region of the given input image. At step 504, generating the given first image includes reducing an intensity of a region of the given first image that corresponds to the central region of the given input image, wherein the intensity of said region of the given first image is reduced with respect to an intensity of the central region of the given input image.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

It will be appreciated that the terms "first" and "second" used herein do not denote any order, quantity or importance, but rather are used to distinguish one element from another.

What is claimed is:

1. A display system comprising eye-tracking means, a first image renderer, a second image renderer, an optical combiner and at least one processor configured to:

process eye-tracking data obtained from the eye-tracking means to determine gaze directions of a user's eyes;

determine, based on the gaze directions of the user's eyes, a gaze location and a gaze velocity and/or acceleration of the user;

detect, based on the gaze location and the gaze velocity and/or acceleration of the user, whether or not the user's gaze has been fixated for at least a predefined time period;

when the user's gaze has been fixated for at least the predefined time period, process a given input image to generate and render a given first image and a given second image substantially simultaneously via the first image renderer and the second image renderer respectively, wherein a projection of the rendered first image and a projection of the rendered second image are to be combined optically by the optical combiner to create an extended-reality scene, and wherein the projection of the rendered second image is to substantially overlap with a portion of the projection of the rendered first image, further wherein a resolution of the projection of the rendered second image is higher than a resolution of the projection of the rendered first image; and when the user's gaze has not been fixated for at least the predefined time period, process the given input image to generate and render a given first image via the first image renderer, whilst switching off or dimming the second image renderer, a projection of the given first image creating the extended-reality scene.

2. The display system of claim 1, wherein, when generating the given first image and the given second image, the at least one processor is configured to:

determine a region of interest of the given input image based on at least one of: the gaze directions of the user's eyes, scene information of the extended-reality scene;

generate the given second image from the region of interest of the given input image; and generate the given first image from at least a region of the given input image that includes and surrounds the region of interest of the given input image.

3. The display system of claim 2, wherein, when generating the given first image, the at least one processor is configured to mask a region of the given first image that corresponds to the region of interest of the given input image, wherein a projection of the masked region of the rendered first image is to substantially overlap with the projection of the rendered second image.

4. The display system of claim 2, wherein, when generating the given first image, the at least one processor is configured to reduce an intensity of a region of the given first image that corresponds to the region of interest of the given input image, wherein the intensity of said region of the given first image is reduced with respect to an intensity of the region of interest of the given input image, wherein, when generating the given second image, the at least one processor is configured to adjust an intensity of the given second image according to the intensity of said region of the given first image.

5. The display system of claim 1, wherein, when generating the given first image and the given second image, the at least one processor is configured to:

generate the given second image from a central region of the given input image; and generate the given first image from at least a region of the given input image that includes and surrounds the central region of the given input image.

6. The display system of claim 5, wherein, when generating the given first image, the at least one processor is configured to mask a region of the given first image that corresponds to the central region of the given input image, wherein a projection of the masked region of the rendered first image is to substantially overlap with the projection of the rendered second image.

7. The display system of claim 5, wherein, when generating the given first image, the at least one processor is configured to reduce an intensity of a region of the given first image that corresponds to the central region of the given input image, wherein the intensity of said region of the given first image is reduced with respect to an intensity of the central region of the given input image, wherein, when generating the given second image, the at least one processor is configured to adjust an intensity of the given second image according to the intensity of said region of the given first image.

8. The display system of claim 5, wherein the at least one processor is configured to:

identify, based on the gaze location of the user, an object of interest in the extended-reality scene;

determine whether the object of interest is located in a central region or a peripheral region of a field of view of the extended-reality scene;

when the user's gaze has been fixated for at least the predefined time period and the object of interest is located in the central region of the field of view, process the given input image to generate and render the given first image and the given second image substantially simultaneously via the first image renderer and the second image renderer respectively; and when the user's gaze has been fixated for at least the predefined time period and the object of interest is located in the peripheral region of the field of view, process the given input image to generate and render the given first image via the first image renderer, whilst switching off or dimming the second image renderer.

9. The display system of claim 1, wherein the predefined time period is 50 milliseconds.

10. The display system of claim 1, further comprising head-tracking means, wherein the at least one processor is configured to process head-tracking data obtained from the head-tracking means to determine a head pose of the user, wherein, when determining the gaze location and the gaze velocity and/or acceleration, the at least one processor is configured to:

determine the gaze location as a three-dimensional location at which the user's gaze is directed, based on the head pose of the user and a convergence of the gaze directions of the user's eyes, wherein the three-dimensional location is determined in a global coordinate space of the extended-reality scene; and determine the gaze velocity and/or acceleration as an angular velocity and/or acceleration with which the user's gaze location is changing.

11. A method of displaying, the method comprising:

processing eye-tracking data obtained from eye-tracking means to determine gaze directions of a user's eyes;

determining, based on the gaze directions of the user's eyes, a gaze location and a gaze velocity and/or acceleration of the user;

detecting, based on the gaze location and the gaze velocity and/or acceleration of the user, whether or not the user's gaze has been fixated for at least a predefined time period;

when the user's gaze has been fixated for at least the predefined time period, processing a given input image to generate and render a given first image and a given second image substantially simultaneously via a first image renderer and a second image renderer respectively, wherein a projection of the rendered first image and a projection of the rendered second image are combined optically by an optical combiner to create an extended-reality scene, and wherein the projection of the rendered second image substantially overlaps with a portion of the projection of the rendered first image, further wherein a resolution of the projection of the rendered second image is higher than a resolution of the projection of the rendered first image; and when the user's gaze has not been fixated for at least the predefined time period, processing the given input image to generate and render a given first image via the first image renderer, whilst switching off or dimming the second image renderer, a projection of the given first image creating the extended-reality scene.

12. The method of claim 11, wherein the step of generating the given first image and the given second image comprises:

determining a region of interest of the given input image based on at least one of: the gaze directions of the user's eyes, scene information of the extended-reality scene;

generating the given second image from the region of interest of the given input image; and generating the given first image from at least a region of the given input image that includes and surrounds the region of interest of the given input image.

13. The method of claim 12, wherein the step of generating the given first image comprises masking a region of the given first image that corresponds to the region of interest of the given input image, wherein a projection of the masked region of the rendered first image substantially overlaps with the projection of the rendered second image.

14. The method of claim 12, wherein the step of generating the given first image comprises reducing an intensity of a region of the given first image that corresponds to the region of interest of the given input image, wherein the intensity of said region of the given first image is reduced with respect to an intensity of the region of interest of the given input image, wherein the step of generating the given second image comprises adjusting an intensity of the given second image according to the intensity of said region of the given first image.

15. The method of claim 11, wherein the step of generating the given first image and the given second image comprises:

generating the given second image from a central region of the given input image; and generating the given first image from at least a region of the given input image that includes and surrounds the central region of the given input image.

16. The method of claim 15, wherein the step of generating the given first image comprises masking a region of the given first image that corresponds to the central region of the given input image, wherein a projection of the masked region of the rendered first image substantially overlaps with the projection of the rendered second image.

17. The method of claim 15, wherein the step of generating the given first image comprises reducing an intensity of a region of the given first image that corresponds to the central region of the given input image, wherein the intensity of said region of the given first image is reduced with respect to an intensity of the central region of the given input image, wherein the step of generating the given second image comprises adjusting an intensity of the given second image according to the intensity of said region of the given first image.

18. The method of claim 15, further comprising:

identifying, based on the gaze location of the user, an object of interest in the extended-reality scene;

determining whether the object of interest is located in a central region or a peripheral region of a field of view of the extended-reality scene;

when the user's gaze has been fixated for at least the predefined time period and the object of interest is located in the central region of the field of view, processing the given input image to generate and render the given first image and the given second image substantially simultaneously via the first image renderer and the second image renderer respectively; and when the user's gaze has been fixated for at least the predefined time period and the object of interest is located in the peripheral region of the field of view, processing the given input image to generate and render the given first image via the first image renderer, whilst switching off or dimming the second image renderer.

19. The method of claim 11, wherein the predefined time period is 50 milliseconds.

20. The method of claim 11, further comprising processing head-tracking data obtained from head-tracking means to determine a head pose of the user, wherein the step of determining the gaze location and the gaze velocity and/or acceleration comprises:

determining the gaze location as a three-dimensional location at which the user's gaze is directed, based on the head pose of the user and a convergence of the gaze directions of the user's eyes, wherein the three-dimensional location is determined in a global coordinate space of the extended-reality scene; and determining the gaze velocity and/or acceleration as an angular velocity and/or acceleration with which the user's gaze location is changing.

* * * * *